March 24, 1970 W. S. BOYLE ET AL 3,502,891

VARIABLE REFLECTANCE MEMORY DEVICE

Filed March 22, 1967 2 Sheets-Sheet 1

INVENTORS: W. S. BOYLE
J. A. MORTON

BY David P. Kelley

ATTORNEY

March 24, 1970 W. S. BOYLE ET AL 3,502,891

VARIABLE REFLECTANCE MEMORY DEVICE

Filed March 22, 1967 2 Sheets-Sheet 2

3,502,891

VARIABLE REFLECTANCE MEMORY DEVICE

Willard S. Boyle, Summit, and Jack A. Morton, South Branch, N.J., assignors to Bell Telephone Laboratories, Incorporated, Murray Hill and Berkeley Heights, N.J., a corporation of New York Filed Mar. 22, 1967, Ser. No. 625,064
Int. Cl. G01d *5/30;* G02f *1/28, 1/36*
U.S. Cl. 250—230 1 Claim

ABSTRACT OF THE DISCLOSURE

A memory module for use in logic or memory systems includes a variable reflectance device and a photosensitive member connected in a circuit, with the photosensitive member disposed to intercept light reflected from the reflectance device. The photosensitive member controls the reflective state of the reflectance device in response to ambient light and a scanning beam of energy.

BACKGROUND OF THE INVENTION

This invention relates to memory modules utilizing variable reflectance devices.

Variable reflectance devices, without memory, are disclosed in the copending application of J. A. Morton and G. E. Smith, Ser. No. 596,509, filed on Nov. 23, 1966 and assigned to applicants' assignee. The phenomenon of variable reflectance, as disclosed therein, is described in terms of two separate and distinct physical effects: electroreflectance and thermoreflectance.

In electroreflectance devices, an electrode is provided adjacent to one surface of an electroreflectance material where light is made incident. It has been found that the reflection of the light from such a surface is higly dependent on the electric field in the space charge layer at the surface of the material adjacent the electrode. A voltage is established across the space charge layer, and this voltage is varied in order to control the reflectance of the material and thereby the intensity of the reflected light. Electroreflectance materials include, for instance, titanium dioxide, ferroelectric semiconducting materials such as potassium tantalate, and the tellurides of lead, tin and germanium.

In thermoflectance devices, on the other hand, it has been found that the reflectance of light from a thermoreflectance material is highly sensitive to the temperature of the material. Such materials are typically characterized by a metal-semiconductor phase transition. That is, there is some transition temperature below which the material is a semiconductor and above which it is metallic. At this transition temperature the reflectance of the material changes abruptly. The temperature of the material is raised to the transition temperature by application thereto of heat energy supplied, for instance, by passing an electric current through the material. By controlling the magnitude of the current, the temperature, and therefore the reflectance, of the material can be varied in order to control the intensity of the reflected light. Thermoreflectance materials include those having a metal-semiconductor phase transition, for instance, vanadium dioxide, vanadium monoxide and vanadium sesquioxide.

SUMMARY OF THE INVENTION

In accordance with an illustrative embodiment, a memory module utilizes a variable reflectance device of the type disclosed in the copending application of J. A. Morton et al., supra. To impart memory to the device a photovoltaic cell is connected in feedback across it, and is disposed so that light reflected from the device is incident upon the cell. The variable reflectance device typically has a high and a low reflectance state depending upon the voltage applied across it, and the photovoltaic cell has a high and a low voltage state depending upon the intensity of light incident upon it.

In the presence of ambient light only, both the device and the cell are in their "low" states. By scanning the module with a beam of energy (e.g., laser beam or electron beam) both the variable reflectance device and the photovoltaic cell are switched to their "high" states. When the beam is no longer incident upon the module, the high reflectance of the variable reflectance device in combination with the ambient light only is sufficient to maintain the photovoltaic cell in its high voltage state. This high voltage is in turn sufficient to maintain the variable reflectance device in its high reflectance state. By this optoelectronic feedback arrangement the module exhibits memory by remaining in its high reflectance state even though the scanning beam is no longer incident upon it.

Arrangements utilizing a plurality of such memory modules to define a reflection pattern in a display device are discussed in detail below.

DESCRIPTION OF THE DRAWINGS

The invention, together with its various features, can be easily understood from the following more detailed description taken in conjunction with the accompanying drawings in which.

DETAILED DESCRIPTION OF THE INVENTION

The following discussion describes memory modules in accordance with the invention utilizing electroreflectance and thermoreflectance devices, light gun and electron gun access, photovoltaic and photoconductive cells, and various combinations thereof. A description of the memory modules embodied in a display device is also included.

Electroreflectance—light gun, time division access

Figure 1A:
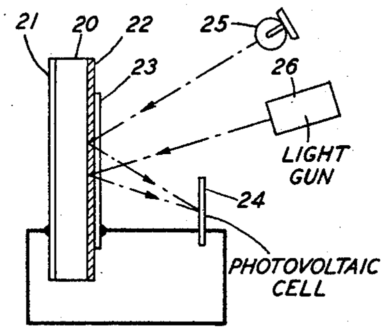
FIG. 1A is a schematic of an electroreflectance memory module using light gun, time division access in accordance with one embodiment of the invention.

A memory module utilizing an electroreflectance (ER) material in a metal, insulator, semiconductor (MIS) structure (of the type disclosed in copending application of C. N. Berglund, Ser. No. 571,555, filed Aug. 10, 1966, and assigned to applicants' assignee) is shown in the schematic of FIG. 1. On one surface of an electroreflecance material 20 is affixed a metal electrode 21. On the opposite surface is a transparent electrical insulator 22. Deposited on the insulator 22 is an optically transparent thin film electrode 23 defining as a region the area of the ER material 20 adjacent to the electrode 23. That region forms a space charge layer in the ER material 20 under the electrode 23 when an electric field, in the reverse bias direction, is established across the electrodes 21 and 23. The field is controlled by photovoltaic cell 24 in order to change the reflectance of the ER material 20 in the defined region.

The photovoltaic cell 24 (of the type disclosed, for instance, in Semiconductor Devices, by J. N. Shive, D. Van Nostrand Co., 1959, pages 1952–157) is disposed so that light reflected from the ER material 20 is incident upon the cell 24. The ER material 20, typically a thin film, was a high and a low reflectance state depending upon the voltage applied across the electrodes 21 and 23. The photovoltaic cell 24 has a high and a low voltage state depending upon the intensity of light incident upon it.

In the presence of ambient light only from the ambient light source 25, both the ER material 20 and the photovoltaic cell 24 are in their "low" states. When the ER material 20 is now scanned with a beam from the light gun 26 (e.g., a laser beam), the beam is reflected onto the cell 24 switching the cell 24 to its high voltage state. The high voltage in turn switches the ER material 20 to its high reflectance state. When the beam from the light gun 26 is no longer incident upon the ER material 20, its high reflectance in combination with the ambient light only is sufficient to maintain the cell 24 in its high voltage state, which in turn maintains the ER material 20 in its high reflectance state. By this optoelectronic feedback arrangement, therefore, the module exhibits memory by remaining in its high reflectance state even though the beam from the light gun 26 is no longer upon it.

Figure 1B:
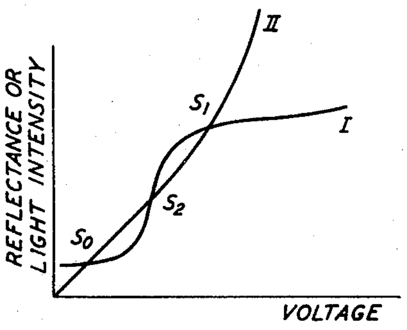
FIG. 1B is a graph exhibiting the two stable states of a memory module in accordance with the invention.

The two states of the memory module are readily exhibited by means of FIG. 1B. Curve I represents the variation of reflectance with voltage for the ER material 20. Curve II represents the variation of light intensity (or reflectance, since one is proportional to the other) with voltage for the photovoltaic cell 24. The intersections of curves I and II, designated $S_0$ and $S_1$, represent, respectively, the "low" and "high" stable states of the memory module. The intersection designated $S_2$ represents an unstable state. In operation, therefore, the module is switched between states $S_0$ and $S_1$ in the manner previously described.

In a matrix of such modules access to each would be on a time division basis because the scanning beam can be incident on only one module at a time. The modules, in effect, share the beam in a time sense.

Figures 1C, 2:
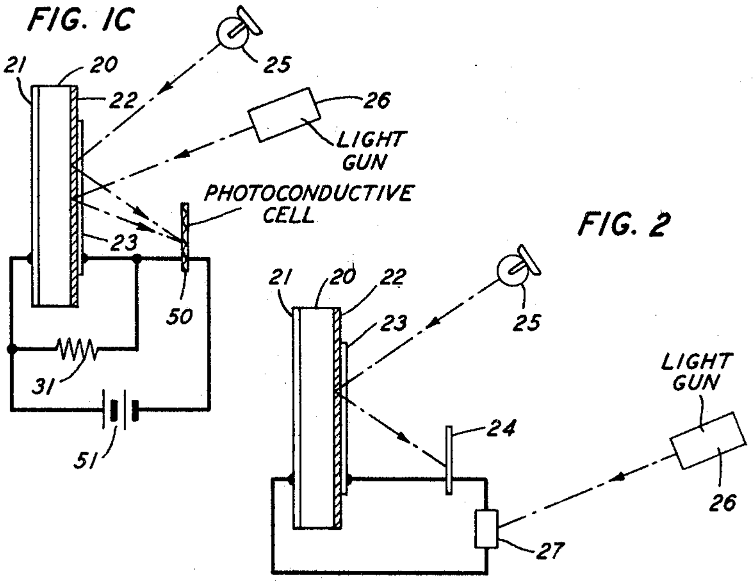
FIG. 1C is a schematic of an electroreflectance memory module using light gun, time division access in accordance with a second embodiment of the invention.
FIG. 2 is a schematic of an electroreflectance memory module using light gun, time division access in accordance with another embodiment of the invention.

The beam from the light gun 26 need not be incident upon the ER material 20 or the photovoltaic cell 24, however, as shown in a second embodiment in FIG. 2. Instead, the light gun 26 scans a second photovoltaic cell 27 which is connected in series with the ER material 20 and the cell 24. The cell 27 converts the scanning light to a voltage which adds to the voltage produced by the cell 24. The "memory" operation is completely analogous to the foregoing. When ambient light is reflected from the ER material 20 onto the cell 24, and scanning light is incident upon the cell 27, the sum of the voltages produced by cells 24 and 27 is sufficient to switch the ER material 20 to its high reflectance state. In the presence of ambient light only, the high reflectance of the ER material 20 is sufficient to maintain the photovoltaic cell 24 in its high voltage state, which in turn maintains the ER material 20 in its high reflectance state. Again, the module exhibits memory by remaining in its high reflectance state even though the scanning beam is no longer incident upon it.

The reflectance of the ER material 20 can be controlled by a photoconductive cell as well as by the photovoltaic cell 24. In the former instance, as shown in FIG. 1C, a photoconductive cell 50 and a battery 51 are connected in series across the ER material 20 and leakage resistor 31 is connected in parallel with it. The voltage of battery

51 is divided proportionally across the leakage resistor 31 (and hence the ER material 20) and the photoconductive cell 50. Because the photoconductive cell 50 is a current device, and because the ER material 20 is sn insulator, the leakage resistor 31 is necessary to provide a closed path for current flow. The photoconductive cell has a high and a low impedance state depending upon the intensity of light incident upon it; and the leakage resistor 31 has a resistance value between the high and low resistances of the photoconductive cell 50. When in its high impedance state, most of the voltage is dropped across the cell 50; when switched to its low impedance state, sufficient voltage is dropped across the leakage resistor 31 to switch the ER material 20 to its high reflectance state. (In effect, therefore, the photoconductive cell 50 has high and low voltage states analogous to those of the photovoltaic cell.) As before, this high reflectance maintains the photoconductive cell in its low impedance state which in turn maintains the ER material 20 in its high reflectance state.

Electroreflectance—electron gun, time division access

Figure 3:
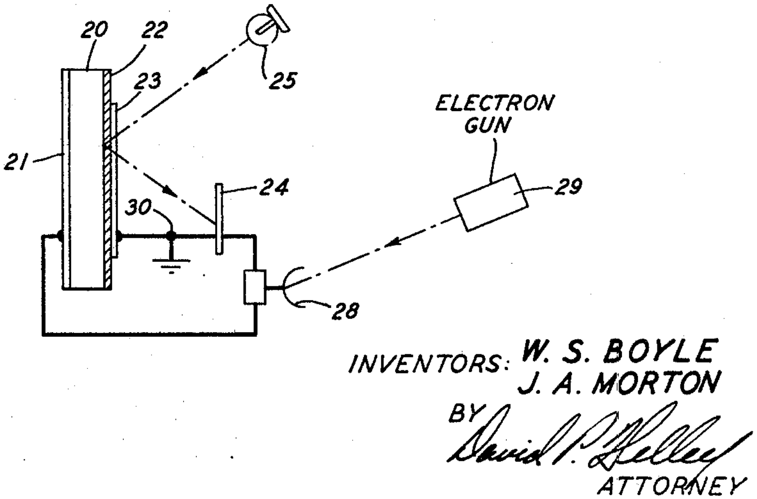
FIG. 3 is a schematic of an electroreflectance memory module using electron gun, time division access in accordance with still another embodiment of the invention.

With electron gun access, an electron beam is converted to a voltage, as shown in FIG. 3, in order to switch the ER material 20 to its high reflectance state. The electron gun 29 scans a metal collector 28 which is connected in series with the photovoltaic cell 24 and the ER material 20. The point 30 between the ER material 20 and the cell 24 is grounded so that the negative charge collected by the collector 28 will reverse bias the ER material 20. Thus, the collector 28 (FIG. 3) operates in a manner analogous to the operation of cell 27 (FIG. 2) to produce memory in conjunction with cell 24.

Thermoreflectance—light gun and electron gun, time division access

Figures 4, 5:
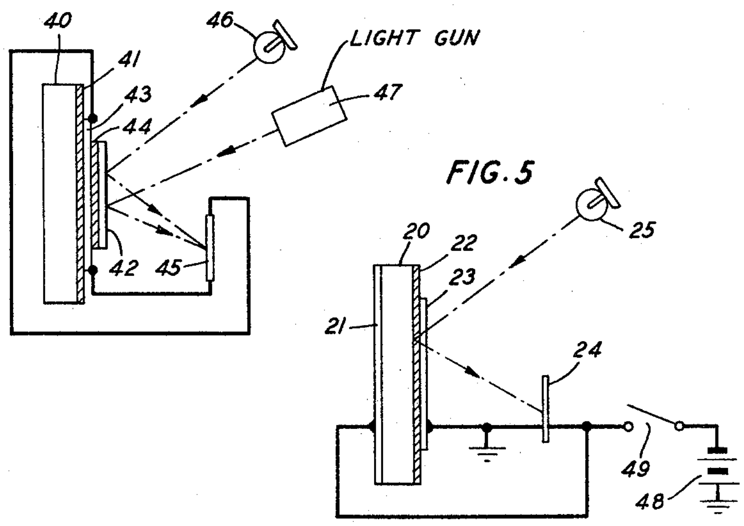
FIG. 4 is a schematic of a thermoreflectance memory module using light gun, time division access in accordance with still another embodiment of the invention.
FIG. 5 is a schematic of an electroreflectance memory module using space division access in accordance with one embodiment of the invention.

The principles of thermoreflectance are embodied in a memory module as shown in FIG. 4. The memory module includes a heat sink 40 upon which is affixed a heat insulator 41. An appropriately doped thermoreflectance layer 42 of crystalline vanadium dioxide, for instance, is electrically insulated from a resistive heater 43 by insulator 44. The photovoltaic cell 45 converts the light of light gun 47 and of ambient light source 46 into a voltage which produces a heating current in the resistive heater 43. The heating current raises the temperature of the layer 42 above its transition temperature and thereby increases its reflectance.

Alternatively the layer 42 may be directly heated by connecting the photovoltaic cell 45 in series with the layer 42, thereby eliminating the insulator 44 and the resistive heater 43.

The operation of imparting memory to the module is the same as that described in the section Electroreflectance Light, Gun, Time Division Access with the exception that herein the voltage produced by the photovoltaic cell 45 is converted into a heating current which in turn controls the temperature of the thermoreflectance material 42.

The embodiments of an electroreflectance memory module utilizing a solar cell with light gun access and a photoconductive cell with light gun access are, of course, both applicable to a thermoreflectance memory module as well. However, to utilize electron gun access with the latter it is not necessary to employ a collector. Rather, the electron beam can be made incident upon the thermoreflectance material directly in order to heat the material and vary its reflectance.

Space division access

The previously described embodiments can readily be incorporated in a matrix or array, access to each module being on a time division basis via the scanning beam. Space division access is also feasible as shown in the electroreflectance module of FIG. 5. Instead of converting a scanning beam into a voltage, the voltage is applied directly to the ER material 20 via the voltage source 48, exemplified here by a battery. The voltage source 48 is controlled by a switch 49 which forms a crosspoint in the array. Each crosspoint in the matrix is accessible at all times, and all simultaneously, by activating the appropriate switches 49.

Similar space division arrangements are possible with thermoreflectance modules by connecting, for example, the voltage source 48 so as to produce a heating current in the thermoreflectance material.

Integrated circuit structure

Figure 6A:
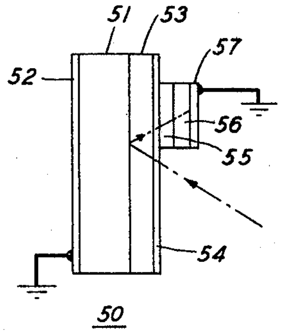
FIGS. 6A and 6B show embodiments of a single memory module of the invention in integrated circuit form.

The embodiments of the present invention are readily fabricated in integrated circuit form by well-known thin film depositions techniques. The electroreflectance memory module of FIG. 1A utilizing a photovoltaic cell is shown in integrated circuit form in FIG. 6A. The module 50 comprises an electroreflectance layer 51 (e.g., potassium tantalate 0.1 mm. thick) on one surface of which is deposited a thin film metal electrode 52 (e.g., Cr-Au alloy 1$\mu$ thick) which is grounded. On the opposite surface is deposited a transparent insulator 53 (e.g., silicon dioxide 1$\mu$ thick). Deposited on the insulator 53 is a transparent thin film conducting plate 54 (e.g., tin oxide 1$\mu$ thick). Two photovoltaic cells 55 and 56 (e.g., selenium-gold cells) are formed on the plate 54, the cell 56 being grounded. The actual number of cells necessary is determined by the voltage required to switch the electroreflectance layer 51.

Incident light is transmitted through the plate 54 and insulator 53, reflected from the electroreflectance layer 51, subsequently transmitted through the photovoltaic cells 55 and 56, and finally incident upon opaque covering 57. The memory operation is as previously described.

Figure 6B:
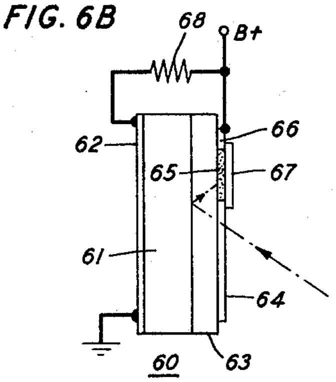

The electroreflectance memory module of FIG. 1C utilizing a photoconductive cell is shown in integrated circuit form in FIG. 6B. The module 60 comprises, as above, an electroreflectance material 61 disposed between metal electrode 62 and insulator 63. On the insulator 63 is deposited a photoconductive cell 65 (e.g., lead sulfide cell) in contact with a transparent conducting film 64 (e.g., tin oxide) and a metallic bus 66 which is connected to a voltage source. The photoconductive cell 65 is covered with an opaque layer 67. A leakage resistor 68, shown as a discrete element is connected in parallel with the electroreflectance material 61.

Light transmitted through the film 64 and insulator 63 is reflected from the electroreflectance material 61 onto the photoconductive cell 65.

Analogous integrated circuit structures can be devised for the various other embodiments in accordance with the invention. The above dimensions and materials are illustrative only and are not to be considered as limitations upon the scope of the invention.

Display device having memory

Figure 7:
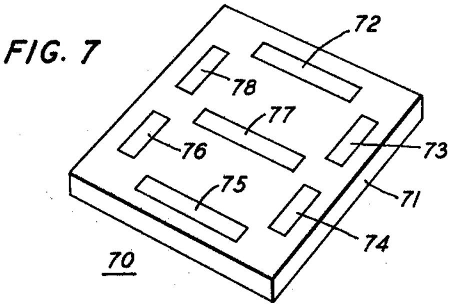
FIG. 7 is a schematic of a general display device.

FIG. 7 shows a general display device 70 comprising a substrate 71 upon which are defined a plurality of variable reflectance regions 72 through 78 in turn defining a reflection pattern. By applying energy, either electrical or thermal, to selected ones of the regions, the reflectance of the selected regions is changed and the reflection pattern is altered in order to form a visible logical arrangement to convey information, e.g., to form numerals.

For example, when ambient light is made incident upon the device 70, application of energy to the regions 72, 73, 74, 75 and 77 causes the reflection pattern to exhibit the numeral "3." Similarly all the numerals from zero to nine can be produced. A more involved arrangement of regions would make it feasible to produce the letters of the alphabet as well.

In addition to ambient light, it is contemplated that the display device may be used in conjunction with a beam of energy (e.g., light or electron) which can be scanned across the reflection pattern and made to be incident upon selected ones of the regions. By so scanning the reflection pattern it is possible in effect to "write" with the beam. To create the impression of "writing," however, it is necessary that each of the regions in the reflection pattern exhibit "memory"; that is, each should retain its high reflectance state in the presence of ambient light only, even though the scanning beam is no longer incident upon the region. This end is accomplished by utilizing a memory module, as previously described, to define each of the variable reflectance regions 72–78. To "wipe" the reflection pattern (e.g., return each module to its low reflectance state), it is required only that the ambient light source be turned off. The display device, of course, contemplates the use of both thermoreflectance and electroreflectance modules with both light gun and electron gun access.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

For example, "wiping" the reflection pattern of the display device can be achieved by merely connecting a second photovolatic cell in series with the first, but of opposite polarity. Other techniques such as reversing the polarity of the drive in the case of space-division access, or changing the beam voltage in the case of electron gun access, accomplish the same end.

What is claimed is:

1. A memory module comprising a variable electroreflectance device having a high and a low reflectance state,
   - means connected to said device for switching said device from its low to its high reflectance state and for maintaining said device in its high reflectance state,
   - a first light source for directing a scanning light beam to said electroreflectance device,
   - a second light source for providing ambient light adequate to maintain said device in its high reflectance state,
   - said switching means being disposed to receive light from said first and second sources reflected from said electroreflectance device and having a first and second voltage state, being switched to its first voltage state in response to said scanning light beam, thereby to switch said device to its high reflectance state, and being maintained in its first voltage state in response to said ambient light, thereby to maintain said device in its high reflectance state,
   - said switching means comprising a leakage resistor connected in parallel with said electroreflectance device and the series combination of a photoconductive cell and voltage source, said photoconductive cell being responsive to said ambient light and to said scanning light beam both reflected from said electroreflectance device onto said cell,
   - said electroreflectance device comprising an electroreflectance material selected from the group consisting of titanium dioxide, potassium tantalate, and the tellurides of lead, tin and germanium.

References Cited

UNITED STATES PATENTS

| | | | |
|---|---|---|---|
| 3,297,878 | 1/1967 | Loebner. | |
| 2,743,430 | 4/1956 | Schultz et al. | 250—212 X |
| 2,929,923 | 3/1960 | Lehovee | 307—311 X |
| 3,024,140 | 3/1962 | Schmidlin | 307—311 X |
| 3,039,005 | 6/1962 | O'Connell et al. | |

(Other references on following page)

UNITED STATES PATENTS

| | | | |
|---|---|---|---|
| 3,092,725 | 6/1963 | Grimmeiss et al. | 250—212 |
| 3,183,359 | 5/1965 | White | 350—160 |
| 3,295,911 | 1/1967 | Ashkin et al. | 307—311 X |
| 3,305,863 | 2/1967 | Jacobs | 350—160 X |
| 3,322,485 | 5/1967 | Williams | 350—160 |
| 3,323,241 | 6/1967 | Blair et al. | 350—160 X |

FOREIGN PATENTS

| | | |
|---|---|---|
| 973,341 | 10/1964 | Great Britain. |
| 1,334,630 | 7/1963 | France. |

OTHER REFERENCES

Physical Review Letters, vol. 15, No. 23; Dec. 6, 1965; pp. 883–885 cited; Shaklee et al.

Reynolds et al., "Photovoltaic Effect in Cadmium Sulfide"; Physical Review, vol. 96; October 1954; pp. 533 and 534 cited.

ROBERT SEGAL, Primary Examiner

U.S. Cl. X.R.

307—311; 350—160